United States Patent
Yu

(10) Patent No.: US 7,147,588 B2
(45) Date of Patent: Dec. 12, 2006

(54) UPSHIFT CONTROL METHOD OF AN AUTOMATIC TRANSMISSION

(75) Inventor: Pyung Hwan Yu, Suwon (KR)

(73) Assignee: Hyundai Motor Company, Seoul (KR)

( * ) Notice: Subject to any disclaimer, the term of this patent is extended or adjusted under 35 U.S.C. 154(b) by 174 days.

(21) Appl. No.: 11/025,477

(22) Filed: Dec. 29, 2004

(65) Prior Publication Data

US 2005/0143218 A1    Jun. 30, 2005

(30) Foreign Application Priority Data

Dec. 30, 2003   (KR) ..................... 10-2003-0100801

(51) Int. Cl.
*B60W 10/02*    (2006.01)
(52) U.S. Cl. ........................................... 477/78
(58) Field of Classification Search .................. 477/65, 477/78
See application file for complete search history.

(56) References Cited

U.S. PATENT DOCUMENTS

| | | | |
|---|---|---|---|
| 5,649,881 A * | 7/1997 | Iizuka | 477/169 |
| 6,102,831 A * | 8/2000 | Wakahara et al. | 477/169 |
| 6,773,372 B1 * | 8/2004 | Matsubara et al. | 477/78 |
| 6,860,833 B1 * | 3/2005 | Ayabe | 477/121 |

FOREIGN PATENT DOCUMENTS

JP    07-279700    10/1995

* cited by examiner

*Primary Examiner*—Dirk Wright
(74) *Attorney, Agent, or Firm*—Morgan Lewis & Bockius LLP

(57) ABSTRACT

Fuel mileage and shift feel are significantly enhanced from an upshift control method of an automatic transmission that includes determining whether a fuel cut control is executed when the damper clutch is in the direct engagement state before an upshift. Performing a hydraulic pressure duty control for the damper clutch, on the basis of at least one control parameter, such that a shift feel is enhanced while the upshift is being progressed and the fuel cut control is executed.

12 Claims, 4 Drawing Sheets

UPSHIFT CONTROL METHOD OF AN AUTOMATIC TRANSMISSION

CROSS REFERENCE TO RELATED APPLICATION(S)

This application claims priority to Korean Patent Application No. 10-2003-0100801, filed on Dec. 30, 2003, the disclosure of which is incorporated herein by reference.

TECHNICAL FIELD OF THE INVENTION

Generally, the present invention relates to an automatic transmission for vehicles. More particularly, the present invention provides an upshift control method for an automatic transmission.

BACKGROUND OF THE INVENTION

Typically, an automatic transmission (AT) automatically shifts from one shift speed into a target shift speed on the basis of various conditions, such as speed of the vehicle, a throttle opening, etc. Such an AT often includes on-coming elements and off-going elements. These elements change during shifting, such as, while the shift speed is shifted into the target shift speed the off-going elements are disengaged by a hydraulic control and the on-coming elements are engaged by the hydraulic control. AT's typically include a torque converter, having a damper clutch, and a power-train having a shift gear mechanism which function as the on-coming or the off-going elements. However, a drawback of a vehicle having this AT is that unnecessary fuel is wasted. That is, since energy is consumed by a slip in the torque converter, the vehicle with the AT has a decreased fuel mileage in comparison with a vehicle with a manual transmission. In addition, because of such a decrease of fuel mileage, the vehicle with the AT expels an exhausting gas having an increased amount of noxious substances and such an increased level of exhaust gas brings about excessive environmental pollution.

Accordingly, to decrease such fuel waste, one previous design provided a damper clutch control method for the automatic transmission. This damper clutch control method acted to engage a damper clutch during an inertia travel under a power-off (when a driver removes their foot from the throttle) in order to intercept any slip in the torque converter. In other words, the purpose was to retain the engine RPM equal to the transmission turbine RPM. According to this method, since an engine output-shift and an AT input-shift engage each other by the damper clutch, slip in the toque converter is not generated. Therefore, since slip of the torque converter is not generated, the fuel mileage should be enhanced. Furthermore, since the damper clutch is engaged during inertia travel under the power-off situation, torque of the AT should be transmitted into an engine and the engine RPM should slowly decelerate. Accordingly, since a fuel cut time becomes longer, the fuel mileage can be enhanced.

However, the damper clutch control has drawbacks. First, since the engaged damper clutch is disengaged while the shift speed is being up-shifted into a higher speed, the engine RPM is rapidly decelerated in comparison with the turbine RPM. Accordingly, a difference between the engine RPM and the turbine RPM becomes large. Consequently, a problem occurs that the damper clutch is not engaged while the vehicle is travels in a high gear. Second, since an interchange of information does not occur between an engine control unit (ECU) and an AT control unit (TCU), a fuel-cut control and the damper clutch control are independently executed. Accordingly, efficiency is decreased. In addition, there is a range for which the damper clutch control can not be executed. For example, the damper clutch control method is not applied while the vehicle is traveling under the power-on condition or while the shift speed is being up-shifted into any speed under the power-off. Accordingly, since an application range of the damper clutch control method is very limited, efficiency of this method is decreased.

Furthermore, since the damper clutch control is executed under the power-off, oil generated by an oil pump is very small, therefore, the time for controlling the damper clutch is retarded. Moreover, since a fuel-cut control is not executed while the damper clutch control is executed, efficiency of the damper clutch method is also decreased.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

An embodiment of the present invention provides an upshift control method for an automatic transmission that enhances fuel mileage and an enhanced shift feel. An exemplary upshift control method according to an embodiment of the present invention includes determining whether a predetermined control condition of a damper clutch is satisfied during an upshift under a power-off. Determining whether a seriate upshift signal is detected when the predetermined control condition is satisfied. Determining whether the damper clutch is in direct engagement before a current upshift when the seriate upshift signal is detected. Determining whether a fuel cut control is executed when the damper clutch is in direct engagement before the current upshift. Performing a hydraulic pressure duty control for the damper clutch, on the basis of at least one control parameter, such that a shift feel is enhanced, while seriate upshifts corresponding to the seriate upshift signal are being progressed, when the fuel cut control is executed.

According to another embodiment, performing a hydraulic pressure duty control includes outputting a first control duty of the damper clutch. The first control duty depends on a shift speed, a turbine RPM, and a transmission oil temperature. Determining whether the current upshift reaches a last interval thereof while the damper clutch is being controlled by the first control duty. Increasing a control duty of the damper clutch by a first predetermined gradient such that a shock is not generated during the last interval, when the current upshift reaches the last interval.

In a further embodiment, performing a hydraulic pressure duty control further includes determining whether a next upshift is progressed while the control duty of the damper clutch is being increased by the first predetermined gradient. Outputting a second control duty of the damper clutch, the second control duty depending on a shift speed, a turbine RPM, and a transmission oil temperature, such that a shift feel is enhanced during the next upshift, when the next upshift is progressed. Determining whether the next upshift reaches a last interval thereof while the damper clutch is being controlled by the second control duty, and increasing a control duty of the damper clutch by a second predetermined gradient such that a shock is not generated during the last interval of the next upshift, when the next upshift reaches the last interval.

In yet a further embodiment, performing a hydraulic pressure duty control further includes changing the control duty of the damper clutch to a predetermined value when a line pressure duty is changed, if it is determined that the line pressure duty has been changed during the increasing the control duty of the damper clutch by the second predetermined gradient.

Still a further embodiment includes performing a hydraulic pressure duty control by maintaining the control duty of the damper clutch at the predetermined value when the control duty of the damper clutch reaches the predetermined value, if it is determined that the line pressure duty has not been changed until the control duty of the damper clutch reaches the predetermined value.

In another further embodiment, the method includes determining whether a disengagement condition of the damper clutch is satisfied while the damper clutch is controlled by the control duty. If so, releasing the fuel cut control when the disengagement condition of the damper clutch is satisfied.

According to yet a further embodiment, the performing a hydraulic pressure duty control further includes detecting a slip quantity (i.e., turbine RPM—engine RPM) when the next upshift is started after the current upshift is finished, and performing a learned control depending on the slip quantity of the damper clutch to compensate the first control duty. Still further, it is determined that the current upshift reaches the last interval if a turbine RPM, under the current upshift, becomes less than a first value that is calculated by multiplying a difference between a turbine RPM, just before the current upshift, and a turbine RPM, just after the current upshift, by a predetermined value.

In yet a further embodiment, it is determined that the next upshift reaches the last interval if a turbine RPM, under the next upshift, becomes less than a second value that is calculated by multiplying a difference between a turbine RPM, just before the next upshift, and a turbine RPM, just after the next upshift, by a predetermined value.

According to still a further embodiment, the predetermined control condition of the damper clutch is determined to exist when a turbine RPM is higher than a first predetermined RPM. Also, when a transmission oil temperature is higher than a predetermined temperature. Still further, when a throttle opening is lower than a predetermined opening, that is, the throttle opening is in a condition of a power-off. The predetermined control condition of the damper clutch is also determined to exist when the turbine RPM is higher than a second predetermined RPM calculated by adding a compensation RPM to a predetermined fuel-cut recovery RPM under the engagement of the damper clutch. Moreover, the condition exists when a current shift speed is higher than a predetermined sift speed and also when a vehicle does not travel on a downgrade.

In a further embodiment, the disengagement condition of the damper clutch is determined to exist when a turbine RPM is lower than the third predetermined RPM for intercepting shock when the fuel cut control is finished. The condition also exists when a throttle opening is higher than the predetermined opening, that is, the throttle opening is in a condition of a power-on. Also, when the turbine RPM is lower than the first predetermined RPM and when the turbine RPM is lower than the second predetermined RPM, calculated by adding a compensation RPM to the fuel cut recovery RPM, predetermined under the engagement of the damper clutch. Moreover, the condition exists when a changing rate (%/sec) of the throttle opening is higher than a predetermined changing rate. The condition also exists when a slope rate (%) is higher than a predetermined slope rate, that is, the vehicle travels on the downgrade or when a slip quantity (engine RPM—turbine RPM) is higher than a predetermined RPM.

BRIEF DESCRIPTION OF THE DRAWINGS

The accompanying drawings, which are incorporated in and constitute a part of the specification, illustrate an embodiment of the invention, and, read together with the description, serve to explain the principles of the invention wherein.

DETAILED DESCRIPTION OF THE EMBODIMENTS

Figure 1:
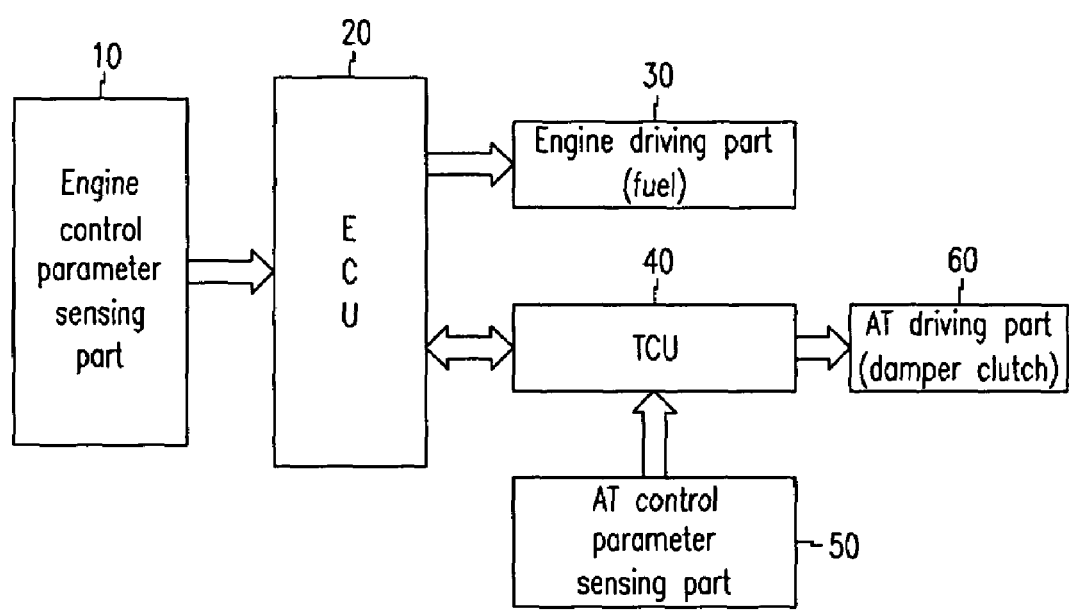
FIG. 1 is a block diagram of a device executing an upshift control method of an automatic transmission for vehicles according to an embodiment of the present invention.

According to FIG. 1, a device executing an upshift control method of an automatic transmission for vehicles includes an engine control parameter sensing part 10 having a variety of sensors. An engine control unit (ECU) 20 for comparing a pre-inputted information with a current driving information of a vehicle inputted from the engine control parameter sensing part 10. Also included is an engine driving part 30 controlled by the ECU 20. In addition, the device for controlling an upshift of a vehicle with an automatic transmission includes an automatic transmission (AT) control parameter sensing part 50 and a transmission control unit (TCU) 40 for comparing a pre-inputted information with both information inputted from the ECU 20 and information inputted from the AT control parameter sensing part 50. Further included is an AT driving part 60 controlled by the TCU 40.

It will be appreciated by one of ordinary skill in the art that the engine control parameter sensing part 10 includes, among other components, a throttle position sensor; a turbine RPM sensor; a vehicle speed sensor; a clank angle sensor; and a coolant temperature sensor, in order to detect all information for controlling an engine, therefore these components will not be described in detail.

The AT control parameter sensing part 50 includes an input/output shaft speed sensor and an oil temperature sensor. Also included is an inhibitor switch and a brake switch, in order to detect all information for controlling an AT. The engine driving part 30 typically means all driving parts for controlling the engine, however, in the present invention, the driving part for an engine control indicates a driving part for controlling fuel. The AT driving part 60 typically means all solenoid valves for controlling oncoming elements and off-going elements, however, in the present invention, the driving part for an AT control indicates a solenoid valve for controlling a damper clutch. In addition, to interchange information between the ECU 20 and the TCU 40, a controller area network (CAN) communication or a SIRIAL communication can be utilized. Furthermore, it will be appreciated by one of ordinary skill in the art that the ECU and CAN include all necessary software and hardware components to communicate with sensors, generate signals, store and manipulate data, and the like.

In a preferred embodiment a dual fuel cut map is predetermined in the ECU 20 in order to enlarge a fuel cut range. Concretely, the dual fuel cut map includes a first fuel cut range under an engagement of the damper clutch and a second fuel cut range under a disengagement thereof. Furthermore, the first and the second fuel cut range are predetermined differently in the ECU 20. As an example, since an engine RPM under the engagement of the damper clutch is higher than an engine RPM under a disengagement thereof, a fuel cut RPM (a first predetermined RPM) under the engagement of the damper clutch can be predetermined higher than a fuel cut RPM (a second predetermined RPM) under a disengagement thereof. Furthermore, since an engine RPM under the engagement of the damper clutch is more slowly decreased than an engine RPM under the disengagement thereof, a fuel cut recovery RPM (a third predetermined RPM) under the engagement of the damper clutch can be predetermined lower than a fuel cut recovery RPM (a fourth predetermined RPM) under the disengagement thereof. Accordingly, the present invention can enlarge the fuel cut range as a difference between the first RPM and the second RPM, and as a difference between the third RPM and the fourth RPM.

The TCU 40 determines whether a fuel cut control is executed by the ECU 20 while an upshift is progressed under a power-off. If the fuel cut control is executed by the ECU 20 before the engagement of the damper clutch is finished, the AT driving part 60 does not engage coercively the damper clutch. That is, the AT driving part 60 engages the damper clutch by a control duty predetermined for enhancing a shift feel.

The TCU 40 and the ECU 20 can be realized by one or more processors activated by a predetermined program, and the predetermined program can be programmed to perform each step of a method according to an embodiment of this invention.

Figure 2:
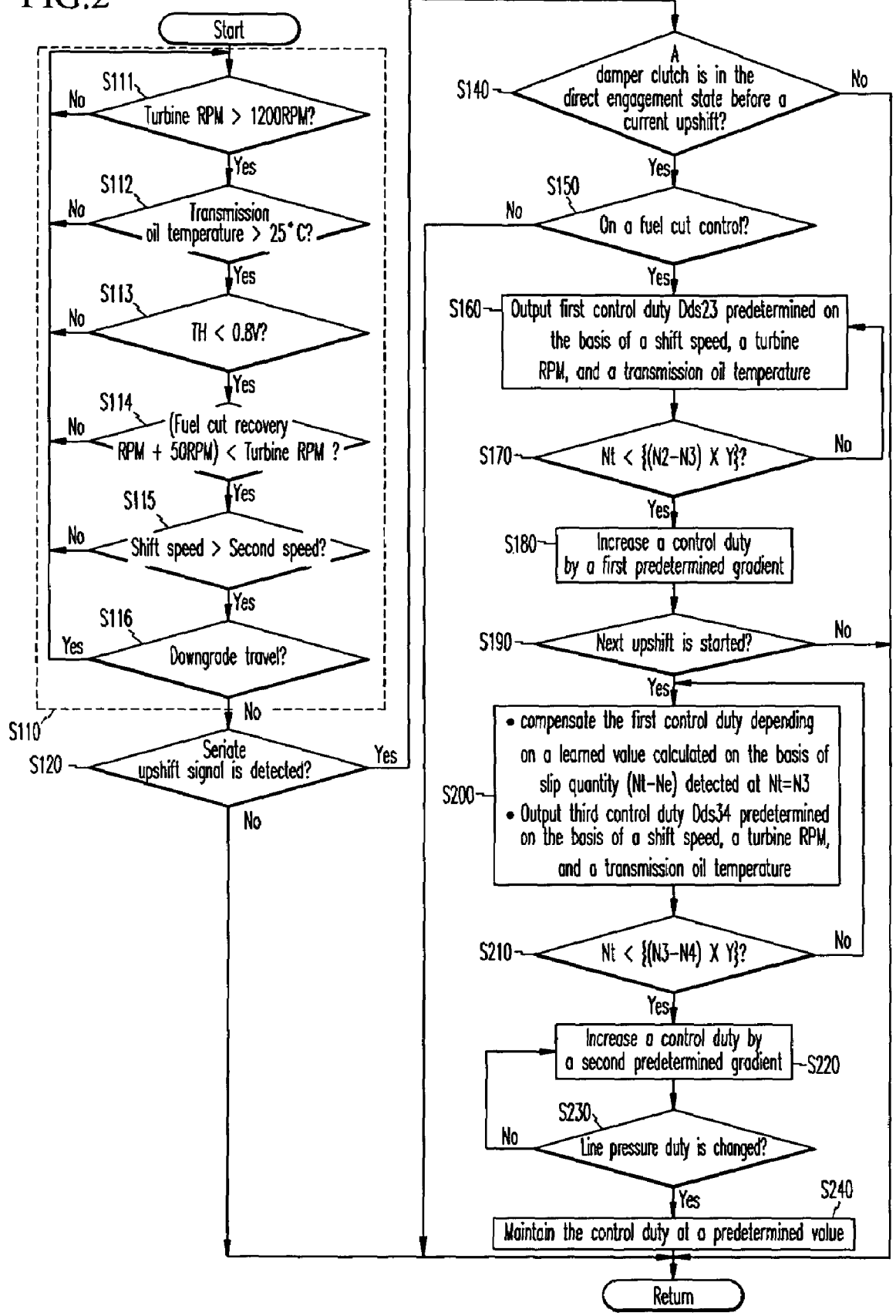
FIG. 2 is a flowchart showing an upshift control method of an automatic transmission for vehicles according to an embodiment of the present invention.
Figure 3:
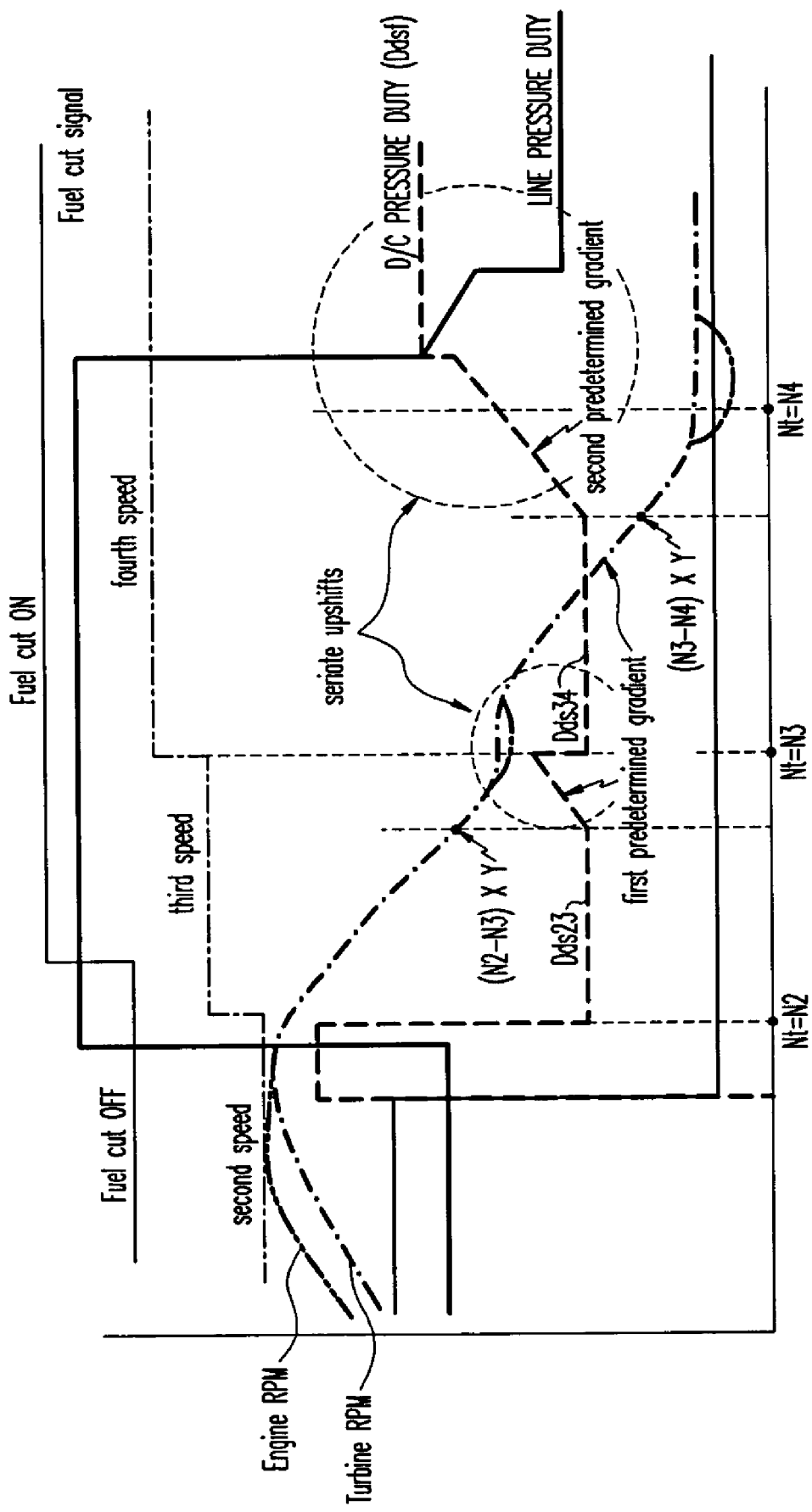
FIG. 3 is a graph showing a control duty of a damper clutch, and a relation between an engine RPM and a turbine RPM, with respect to time and each shift speed, in an upshift control method of an automatic transmission for vehicles according to an embodiment of the present invention.

FIG. 2 is a flowchart showing an upshift control method of an automatic transmission and FIG. 3 is a graph showing a control duty of a damper clutch as well as a relation of an engine RPM and a turbine RPM, with respect to time and each shift speed. An upshift control method of an automatic transmission for vehicles according to an embodiment of the present invention will hereinafter be described in detail with reference to the FIGS. 2 and 3. Firstly, while a vehicle is traveling at any shift speed (for example, "second speed" of FIG. 3) under a power-on, the ECU 20 and the TCU 40 recognize various driving information of the vehicle.

The TCU 40 determines whether the driving information of the vehicle detected by the AT control parameter sensing part 50 is information of an upshift under a power-off condition. At step S110, the TCU 40 determines whether a predetermined control condition of a damper clutch is detected by the AT control parameter sensing part 50 during the up-shift under the power-off. The predetermined control condition of a damper clutch is determined to exist if all of following cases are satisfied:

1) at step S111, a turbine RPM is higher than a fifth predetermined RPM (for example, 1,200 RPM);

2) at step S112, a transmission oil temperature is higher than a predetermined temperature (for example, 25 degrees C.);

3) at step S113, a throttle opening TH is lower than a predetermined opening (for example, 0.8V), that is the throttle opening is under a power-off;

4) at step S114, the turbine RPM is higher than a sixth predetermined RPM calculated by adding a compensation RPM (for example, 50 RPM) to a predetermined fuel-cut recovery RPM (the third predetermined RPM) under an engagement of a damper clutch;

5) at step S115, a current shift speed is higher than the second speed; and 6) at step S116, a vehicle does not travel on a downgrade.

Accordingly, when all cases are detected by the AT control parameter sensing part 50, at step S120, the TCU 40 determines whether a seriate upshift signal is detected by the AT control parameter sensing part 50.

When the seriate upshift signal is not detected by the AT control parameter sensing part 50 at the step S120, the TCU 40 starts all the steps again. However, when the seriate upshift signal is detected by the AT control parameter sensing part 50 at the step S120, the TCU 40 determines, at step S140, whether the damper clutch is in a direct engagement state before a current upshift.

When the damper clutch is in the direct engagement state at the step S140, the ECU 20 determines, at step S150, whether a fuel cut control is executed while the current upshift is progressed. When the fuel cut control is not executed at the step S150, the TCU 40 starts all the steps again. However, when the fuel cut control is executed at the step S150, the TCU 40 performs a hydraulic pressure duty control for the damper clutch, on the basis of at least one control parameter, such that a shift feel is enhanced, while seriate upshifts corresponding to the seriate upshift signal are being progressed.

The hydraulic pressure duty control for the damper clutch operation control will hereinafter be explained. At step S160, the TCU 40 outputs a first control duty Dds23 of the damper clutch, the first control duty Dds23 depending on a shift speed, a turbine RPM, and a transmission oil temperature.

While the damper clutch is being controlled by the first control duty Dds23 at the step S160, the TCU 40 determines, at step S170, whether the current upshift reaches a last interval thereof. When the current upshift reaches the last interval at the step S170, the TCU 40 increases, at step S180, a control duty of the damper clutch by a first predetermined gradient such that a shock is not generated during the last interval of the current upshift.

It is determined that the current upshift reaches the last interval, if a turbine RPM Nt under the current upshift becomes less than a first value $(N2-N3)*Y$ that is calculated by multiplying a difference $(N2-N3)$ between a second speed synchronous turbine RPM N2 and a third speed synchronous turbine RPM N3 by a predetermined value Y. It can be determined that a shock occurs at a point when a condition of $[Nt<(N2-N3)*Y]$ exists, and such a predetermined value Y may be determined through experiments. That is, the TCU 40 increases a control duty of the damper clutch by the first predetermined gradient, at a point when the turbine RPM Nt is less than the first value $(N2-N3)*Y$, and the TCU 40 maintains the increasing the control duty of the damper clutch by the first predetermined gradient during the last interval. After this, while the control duty of the damper clutch is being increased by the first predetermined gradient at the step S180, the TCU 40 determines, at step S190, whether a next upshift is progressed.

When the next upshift is started after the current upshift is finished at the step S190, the AT control parameter sensing part 50 detects, at step S200, a slip quantity (turbine RPM—engine RPM), the TCU 40 performs a learned control depending on the slip quantity of the damper clutch to compensate the first control duty. Accordingly, the TCU 40 can more perfectly control the damper clutch when the damper clutch is again controlled by the first control duty. When the next upshift is progressed, step S190, the TCU 40 outputs, at step S200, a second control duty Dds34 of the damper clutch, the second control duty Dds34 depending on a shift speed, a turbine RPM, and a transmission oil temperature, such that a shift feel is enhanced. The TCU 40 maintains the second control duty Dds34 while the next upshift is progressed.

While the damper clutch is being controlled by the second control duty Dds34 at the step S200, the TCU 40 determines, at step S210, whether the next upshift reaches a last interval thereof. When the next upshift reaches the last interval at the step S210, the TCU 40 increases, at step S220, a control duty of the damper clutch by a second predetermined gradient such that a shock is not generated during the last interval of the next upshift.

It is determined that the next upshift reaches the last interval if a turbine RPM Nt under the next upshift becomes less than a second value (N2−N3)*Y that is calculated by multiplying a difference (N3−N4) between a third speed synchronous turbine RPM N3 and a fourth speed synchronous turbine RPM N4 by a predetermined value Y. It can be determined that a shock occurs at a point when a condition of [Nt<(N3−N4)*Y] exists, and such predetermined value Y may be determined through experiments. That is, the TCU 40 increases a control duty of the damper clutch by the second predetermined gradient, at a point when the turbine RPM Nt is less than the second value (N3−N4)*Y, and the TCU 40 maintains the increasing the control duty of the damper clutch by the second predetermined gradient during the last interval. After this, while the control duty of the damper clutch is being increased by the second predetermined gradient, step S220, since a hydraulic pressure of the damper clutch is affected by a line pressure, the TCU 40 determines, step S230, whether a line pressure duty is changed, in order to decrease a shock.

Figure 4:
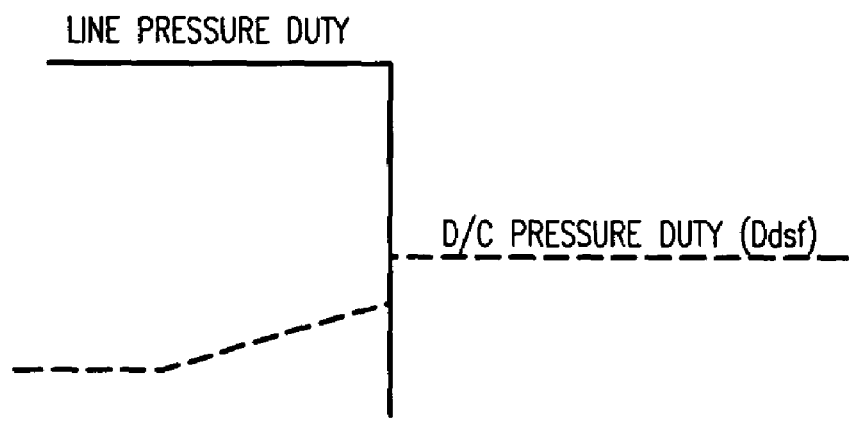
FIG. 4 is a graph showing relation between a line pressure duty and a control duty of a damper clutch, in an upshift control method of an automatic transmission for vehicles according to an embodiment of the present invention.

When the line pressure is changed at the step S230, the TCU 40 determines whether the control duty of the damper clutch reaches a predetermined value Ddsf. When the control duty reaches the predetermined value Ddsf, the TCU 40 maintains, at step S240, the control duty at the predetermined value Ddsf. However, if the control duty does not reach the predetermined value Ddsf, the TCU 40, as shown in FIG. 4, changes the control duty to the predetermined value Ddsf when the line pressure is changed. On the other hand, when the line pressure duty is not changed at the step S230 while the control duty of the damper clutch is increased by the second predetermined gradient, the TCU 40 determines whether the control duty reaches the predetermined value Ddsf.

Figure 5:
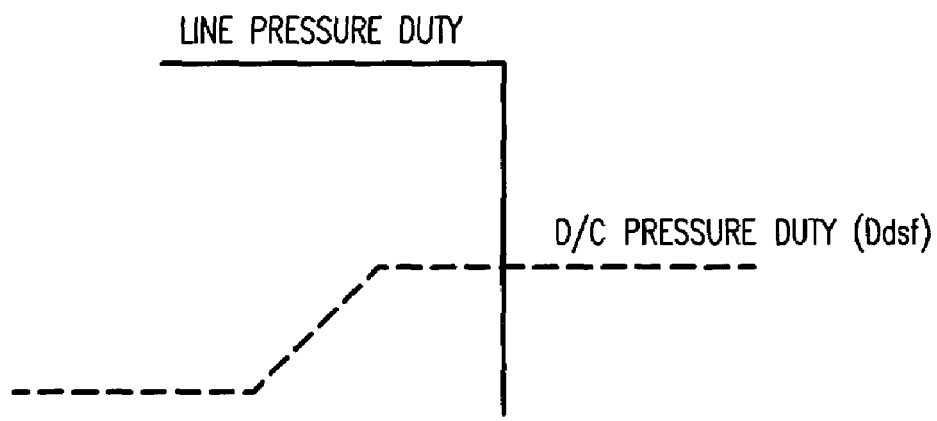
FIG. 5 is a graph showing a relation between a line pressure duty and a control duty of a damper clutch, in an upshift control method of an automatic transmission for vehicles according to another embodiment of the present invention.

When the control duty reaches the predetermined value Ddsf before the line pressure duty is changed, the TCU 40, as shown in FIG. 5, maintains the control duty at the predetermined value Ddsf before the line pressure duty is varied. While the damper clutch is controlled by the control duty, the TCU 40 determines whether a disengagement condition of the damper clutch is detected by the AT control parameter sensing part 50. The disengagement condition of the damper clutch may be determined to exist if at least one of following cases is satisfied:

1) a turbine RPM is lower than the seventh predetermined RPM (RPM predetermined for intercepting a shock generated when the fuel cut control is finished, for example 1200 RPM);

2) a throttle opening TH is higher than the predetermined opening (for example, 0.8V), that is, throttle opening is under a power-on;

3) the turbine RPM is lower than the fifth predetermined RPM (for example, 1,200 RPM);

4) the turbine RPM is lower than the sixth predetermined RPM calculated by adding a compensation RPM (for example, 50 RPM) to the predetermined fuel cut recovery RPM (the third predetermined RPM) under the engagement of the damper clutch;

5) a changing rate (%/sec) of throttle open is higher than a predetermined changing rate;

6) a slope rate (%) is higher than a predetermined slope rate, that is, the vehicle travels on a downgrade; or 7) a slip quantity (engine RPM—turbine RPM) is higher than a predetermined RPM.

Accordingly, when at least one of the cases is detected by the AT control parameter sensing part 50, the TCU 40 orders the AT driving part 60 to disengage the damper clutch, and sends this information to the ECU 20. Furthermore, the ECU 20 releases the fuel cut control, and executes a fuel injection.

In light of this description, it will be appreciated that the present invention provides many advantages, including the following. A hydraulic pressure duty control for a damper clutch and the fuel-cut control is executed during the upshift under the power-off, therefore, a fuel cut range can be enlarged in comparison with a fuel cut range of other techniques. Particularly, since the fuel-cut control is executed without a shock and slip while the hydraulic pressure duty control for the damper clutch is being executed, a fuel cut range can be enlarged in comparison with traditional fuel cut ranges. Additionally since the dual fuel cut map is predetermined in the ECU, the fuel cut range can be enlarged and because a learned control is provided, a response quality can be enhanced.

While this invention has been described in connection with what is presently considered to be the most practical and preferred embodiment, it is to be understood that the invention is not limited to the disclosed embodiments, but, is intended to cover various modifications and equivalent arrangements included within the spirit and scope of the appended claims.

What is claimed is:

1. An upshift control method of an automatic transmission, comprising:
   determining whether a predetermined control condition of a damper clutch is satisfied during an upshift under a power-off;
   determining whether a seriate upshift signal is detected, when the predetermined control condition is satisfied;
   determining whether the damper clutch is in a direct engagement state before a current upshift, when the seriate upshift signal is detected;
   determining whether a fuel-cut control is executed, when the damper clutch is in the direct engagement state before the current upshift; and
   performing a hydraulic pressure duty control for the damper clutch, on the basis of at least one control parameter, such that a shift feel is enhanced, while seriate upshifts corresponding to the seriate upshift signal are being progressed, when the fuel cut control is executed.

2. The method of claim 1, wherein the performing a hydraulic pressure duty control comprises:
   outputting a first control duty of the damper clutch, the first control duty depending on a shift speed, a turbine RPM, and a transmission oil temperature;
   determining whether the current upshift reaches a last interval thereof, while the damper clutch is being controlled by the first control duty; and
   increasing a control duty of the damper clutch by a first predetermined gradient such that a shock is not generated during the last interval, when the current upshift reaches the last interval.

3. The method of claim 2, wherein the performing a hydraulic pressure duty control further comprises:
   determining whether a next upshift is progressed while the control duty of the damper clutch is being increased by the first predetermined gradient;
   outputting a second control duty of the damper clutch, the second control duty depending on a shift speed, a turbine RPM, and a transmission oil temperature, such that a shift feel is enhanced during the next upshift, when the next upshift is progressed;
   determining whether the next upshift reaches a last interval thereof while the damper clutch is being controlled by the second control duty; and
   increasing a control duty of the damper clutch by a second predetermined gradient such that a shock is not generated during the last interval of the next upshift, when the next upshift reaches the last interval.

4. The method of claim 3, wherein the performing a hydraulic pressure duty control further comprises:
   changing the control duty of the damper clutch to a predetermined value when a line pressure duty is changed, if it is determined that the line pressure duty has been changed during the increasing the control duty of the damper clutch by the second predetermined gradient.

5. The method of claim 4, wherein the performing a hydraulic pressure duty control further comprises, maintaining the control duty of the damper clutch at the predetermined value when the control duty of the damper clutch reaches the predetermined value, if it is determined that the line pressure duty has not been changed until the control duty of the damper clutch reaches the predetermined value.

6. The method of claim 1, further comprising:
   determining whether a disengagement condition of the damper clutch is satisfied while the damper clutch is controlled by the control duty; and
   releasing the fuel cut control when the disengagement condition of the damper clutch is satisfied.

7. The method of claim 3, the performing a hydraulic pressure duty control further comprises:
   detecting a slip quantity (turbine RPM—engine RPM) when the next upshift is started after the current upshift is finished; and
   performing a learned control depending on the slip quantity of the damper clutch to compensate the first control duty.

8. The method of claim 2, wherein it is determined that the current upshift reaches the last interval, if a turbine RPM under the current upshift becomes less than a first value that is calculated by multiplying a difference between a turbine RPM just before the current upshift and a turbine RPM just after the current upshift by a predetermined value.

9. The method of claim 3, wherein it is determined that the next upshift reaches the last interval, if a turbine RPM under the next upshift becomes less than a second value that is calculated by multiplying a difference between a turbine RPM just before the next upshift and a turbine RPM just after the next upshift by a predetermined value.

10. The method of claim 1, wherein the predetermined control condition of the damper clutch is determined to exist when:
    a turbine RPM is higher than first predetermined RPM;
    a transmission oil temperature is higher than a predetermined temperature;
    a throttle opening is lower than a predetermined opening, that is, the throttle opening is in a condition of a power-off;
    the turbine RPM is higher than a second predetermined RPM calculated by adding a compensation RPM to a predetermined fuel-cut recovery RPM under the engagement of the damper clutch;
    a current shift speed is higher than a predetermined shift speed; and
    a vehicle does not travel on a downgrade.

11. The method of claim 6, wherein the disengagement condition of the damper clutch is determined to exist when one of the conditions of the group consisting of the following conditions exist: a turbine RPM is lower than the third predetermined RPM for intercepting shock when the fuel cut control is finished; a throttle opening is higher than the predetermined opening, that is, the throttle opening is in a condition of a power-on; the turbine RPM is lower than the first predetermined RPM; the turbine RPM is lower than the second predetermined RPM calculated by adding a compensation RPM to the fuel cut recovery RPM predetermined under the engagement of the damper clutch; a changing rate (%/sec) of the throttle opening is higher than a predetermined changing rate; a slope rate (%) is higher than a predetermined slope rate, that is, the vehicle travels on the downgrade; or a slip quantity (engine RPM—turbine RPM) is higher than a predetermined RPM.

12. An upshift control method of an automatic transmission, comprising:
    determining whether a predetermined control condition of a damper clutch is satisfied during an upshift under a power-off;
    determining whether a seriate upshift signal is detected, when the predetermined control condition is satisfied;
    determining whether the damper clutch is in a direct engagement state before a current upshift, when the seriate upshift signal is detected;
    determining whether a fuel-cut control is executed, when the damper clutch is in the direct engagement state before the current upshift; and
    performing a hydraulic pressure duty control for the damper clutch.

* * * * *